United States Patent
Celik et al.

(10) Patent No.: US 10,384,409 B2
(45) Date of Patent: Aug. 20, 2019

(54) METHOD OF MANUFACTURING A NON-PNEUMATIC SUPPORT STRUCTURE

(71) Applicant: The Goodyear Tire & Rubber Company, Akron, OH (US)

(72) Inventors: Ceyhan Celik, Stow, OH (US); George Michael Stoila, Tallmadge, OH (US); Steven Amos Edwards, Akron, OH (US); James Alfred Benzing, II, North Canton, OH (US); William Andrew Haydu, Jr., Copley, OH (US); Todd Andrew Bachochin, Peninsula, OH (US); Michael James Hogan, Tallmadge, OH (US); Timothy Scott Miller, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 457 days.

(21) Appl. No.: 15/351,687

(22) Filed: Nov. 15, 2016

(65) Prior Publication Data
US 2018/0133992 A1    May 17, 2018

(51) Int. Cl.
*B29D 30/02* (2006.01)
*B29D 30/00* (2006.01)
*B60B 9/26* (2006.01)
*B60C 7/12* (2006.01)
(Continued)

(52) U.S. Cl.
CPC ......... *B29D 30/02* (2013.01); *B29D 30/0005* (2013.01); *B29D 30/005* (2013.01);
(Continued)

(58) Field of Classification Search
CPC .. B29D 30/005; B29D 30/02; B29D 30/0601; B60B 9/26; B60C 7/00; B60C 7/08;
(Continued)

(56) References Cited

U.S. PATENT DOCUMENTS

| 479,255 A | 7/1892 | Dunlop |
| 482,175 A | 9/1892 | Hollafolla |

(Continued)

FOREIGN PATENT DOCUMENTS

| CN | 204685761 U | 9/2015 |
| GB | 191406290 A | 1/1915 |
| JP | 2011219009 A | 11/2011 |

OTHER PUBLICATIONS

European Search Report dated Feb. 26, 2018 for Appllication Serial No. EP17199906.

*Primary Examiner* — Robert C Dye
*Assistant Examiner* — Sedef E Paquette
(74) *Attorney, Agent, or Firm* — Robert N. Lipcsik

(57) ABSTRACT

A system manufactures a tire assembly. The system includes a core having a cylindrical hub and radially protruding extensions projecting radially outward from the hub, a plurality of internal arcuate members for positioning a reinforcing layer of the tire assembly about the core, the internal arcuate members being disposed in spaces between the extensions of the core, a first side plate for securing the internal arcuate members in place relative to the core, and a second side plate for securing the core and internal arcuate members to each other.

9 Claims, 6 Drawing Sheets

(51) Int. Cl.
*B60C 7/18* (2006.01)
*B60C 7/24* (2006.01)

(52) U.S. Cl.
CPC ............... *B60B 9/26* (2013.01); *B60C 7/125* (2013.01); *B60C 7/18* (2013.01); *B60C 7/24* (2013.01)

(58) Field of Classification Search
CPC ........... B60C 7/102; B60C 7/125; B60C 7/18; B60C 7/22; B60C 7/24; B60C 7/28; B60C 2007/005
USPC ........................................ 156/112; 152/379.3
See application file for complete search history.

(56) References Cited

U.S. PATENT DOCUMENTS

| | | |
|---|---|---|
| 889,782 A | 6/1908 | Higgins |
| 1,002,003 A | 8/1911 | Simonson |
| 1,233,722 A | 7/1917 | Smith |
| 1,389,285 A | 8/1921 | Althoff |
| 1,451,517 A | 4/1923 | Smith |
| 1,930,764 A | 10/1933 | Mallory |
| 3,493,027 A | 2/1970 | Dewhirst |
| 4,226,273 A | 10/1980 | Long |
| 4,235,270 A | 11/1980 | Kahaner |
| 4,602,823 A | 7/1986 | Berg |
| 5,343,916 A | 9/1994 | Duddey |
| 5,800,643 A | 9/1998 | Frankowski |
| 6,068,721 A | 5/2000 | Dyer |
| 6,260,598 B1 | 7/2001 | Tanaka |
| 8,962,120 B2 | 2/2015 | Delfino |
| 2004/0069385 A1 | 4/2004 | Timoney |
| 2008/0303337 A1* | 12/2008 | Krantz .................. B60B 23/00 301/5.306 |
| 2010/0193097 A1 | 8/2010 | McNier |
| 2013/0014874 A1* | 1/2013 | Moon .................... B60C 7/14 152/246 |

* cited by examiner

METHOD OF MANUFACTURING A NON-PNEUMATIC SUPPORT STRUCTURE

FIELD OF INVENTION

The present invention relates to wheel/tire assemblies, and more particularly, to non-pneumatic wheel/tire assemblies.

BACKGROUND OF THE INVENTION

Radial pneumatic tires rely on the ply reinforcement to carry and transfer the load between the rim and the belt layer. These ply cords need to be tensioned to carry the load. Tensioning of these ply cords is achieved with the pressurized air in the inner chamber of the tire. If air pressure is lost, load carrying capacity of a pneumatic tire decreases significantly. Preventing the slow or sudden air pressure loss has been a challenge for the tire makers. One proposed solution is to use non-pneumatic tires. A top loader non-pneumatic tire can perform similar to a pneumatic tire if its durability, speed rating/limit and load capacity can be increased to the levels of a pneumatic tire.

Many top loader non-pneumatic tires rely on the polymeric spokes to carry the load of the vehicle. Spokes transfer the load from the rim to the shear band. Due to the characteristics of the polymeric materials used in the spokes of these tires, performance of these tires are limited. It is an object of the present invention to overcome this limitation and increase the load carrying capacity and durability of these spokes and hence the performance of the top loader non-pneumatic tire.

SUMMARY OF THE INVENTION

A system in accordance with the present invention manufactures a tire assembly. The system includes a core having a cylindrical hub and radially protruding extensions projecting radially outward from the hub, a plurality of internal arcuate members for positioning a reinforcing layer of the tire assembly about the core, the internal arcuate members being disposed in spaces between the extensions of the core, a first side plate for securing the internal arcuate members in place relative to the core, and a second side plate for axially, radially, and circumferentially securing the core and internal arcuate members to each other.

According to another aspect of the system, the internal arcuate members have axial projections extending through corresponding axial shafts in each of the first and second side plates.

According to still another aspect of the system, a plurality of external arcuate members encase the tire assembly, as well as the core, the internal arcuate members, first side plate, and second side plate, to form an apparatus for curing the tire assembly.

According to yet another aspect of the system, the reinforcement layer comprises calendered fabric and rubber compound treatments.

According to still another aspect of the system, the reinforcement layer comprises calendered fabric and rubber compound treatments applied to an outer surface of the core across a full 360 degree circumference of the core.

According to yet another aspect of the system, projections of the internal arcuate members are inserted through shafts in the first and second side plates.

According to still another aspect of the system, extruded rubber wedges are disposed on the reinforcement layer in depressions between the extensions of the core and the internal arcuate members.

According to yet another aspect of the system, projections of the internal arcuate members are axially inserted through shafts in the first and second side plates with the projections engaging first and second lock rings.

According to still another aspect of the system, projections of the internal arcuate members are axially inserted through axial shafts within first and second side plates with the projections of the internal arcuate members engaging the first and second side plates to secure the core and the internal arcuate members in radial alignment.

According to yet another aspect of the system, the reinforcement layer comprises calendered fabric and rubber compound treatments applied to an outer surface of the core across a full 360 degree circumference of the core with a shear band structure applied over the reinforcement layer.

A method in accordance with the present invention manufactures a non-pneumatic tire/wheel. The method includes the steps of: providing calendered a reinforcement layer of fabric/cord and rubber compound treatments/sheets; laying the reinforcement layer on an outer surface of a core across a full 360 degree circumference of the core; rotating the core to facilitate the laying step; securing the reinforcement layer in position on the core by positioning internal arcuate members circumferentially between extensions of the core; inserting projections of an internal arcuate member through the shafts of the first side plate; and fastening the core and internal arcuate members between the first side plate and a second side plate by securing the second side plate to the projections of the internal arcuate member extending from the internal arcuate members.

According to another aspect of the method, another step includes splicing two ends of the reinforcement layer to create a continuous ply about the core.

According to still another aspect of the method, another step includes placing extruded rubber wedges over the reinforcement layer in depressions between the extensions of the core and the internal arcuate members.

According to yet another aspect of the method, another step includes securing the rubber wedges to the reinforcement layer applying pressure.

According to still another aspect of the method, another step includes placing a shear band component over the reinforcement layer and securing the shear band component to the reinforcement layer.

According to yet another aspect of the method, another step includes applying heat and pressure to cure rubber components of the non-pneumatic tire/wheel.

According to still another aspect of the method, another step includes securing the shear band component to the reinforcement layer by adhesive.

According to yet another aspect of the method, another step includes encasing the shear band component with external arcuate members.

BRIEF DESCRIPTION OF THE DRAWINGS

The present invention will be more clearly understood by the following description of some examples thereof, with reference to the accompanying drawings, in which.

DESCRIPTION OF EXAMPLES OF THE PRESENT INVENTION

A conventional tire assembly, such as that described in US 2004/0069385, incorporated herein by reference in its entirety, and may have an outer ring, such as a shear band, flexibly connected to a central hub by means of lightweight composite springs. The springs may be plates fixed to the ring and to the hub. The hub may contain a speed reduction gear unit and/or an electric motor and may have a suspension mechanism for connecting a vehicle chassis to each wheel. The ring may be constructed from a flexible composite material, such as carbon fiber reinforced nylon material and have twin rubber tires and a plurality of circumferentially spaced-apart radial cleats which engage the ground and provide improved traction. The hub may also be formed from a carbon fiber reinforced composite material. Another conventional wheel may have a rubber strip with a molded tread bonded to a composite ring for improved grip. Further, the springs interconnecting the ring and hub may be S-shaped lightweight composite springs.

Another conventional tire assembly may be formed from a lightweight composite material, such as carbon fiber reinforced polyamide. The assembly may have a cylindrical central hub and a circular outer flexible rim mounted on the central hub by an endless looped spring band extending between the central hub and the circular rim. Six radial loops may be defined by the spring band. The spring band may be attached to the central hub and to the circular rim by any suitable means, such as adhesion, cohesion, soldering and/or mechanical fixing by means of bolts, rivets, and/or clamps.

Figure 1:
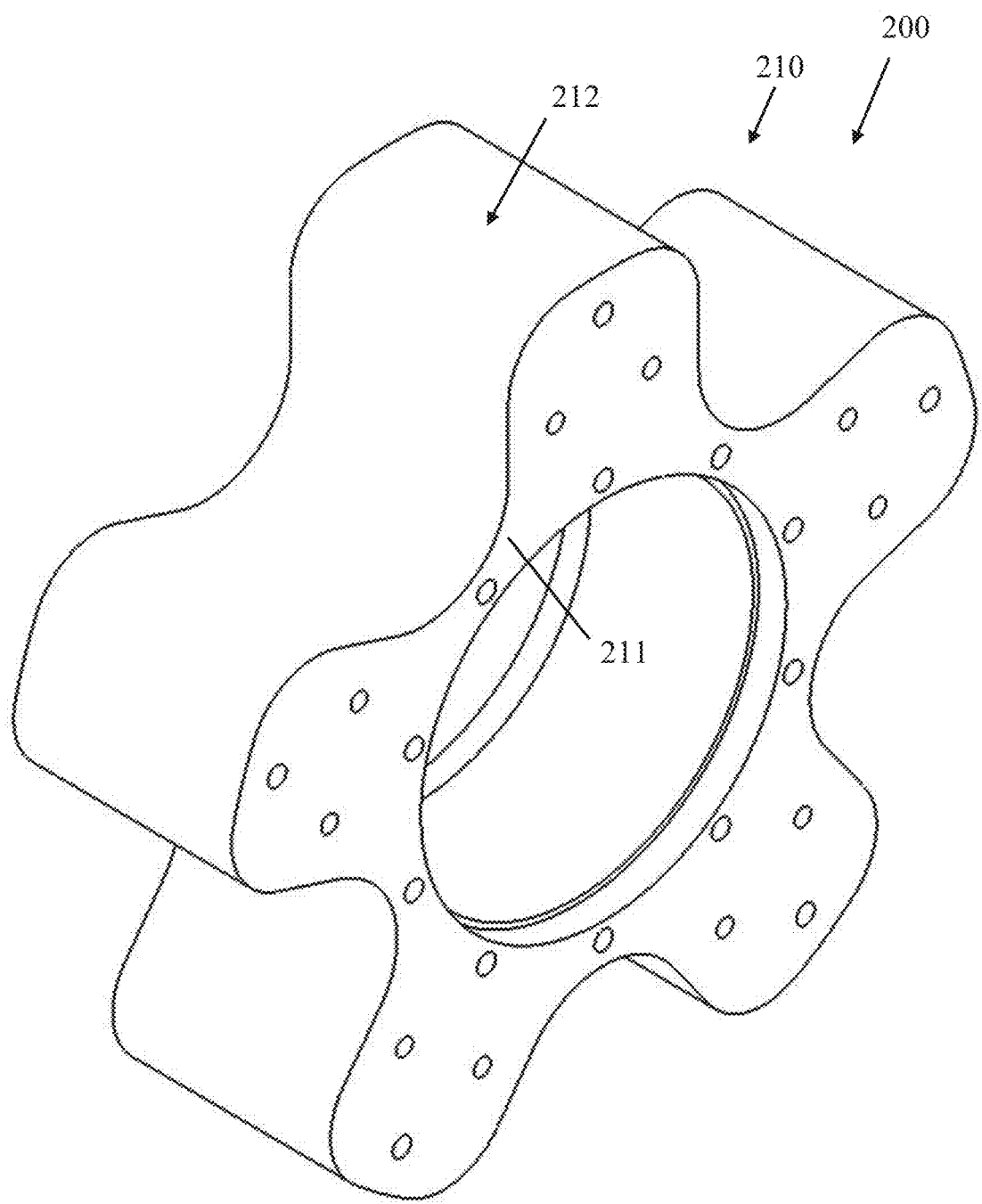
FIG. 1 is a schematic perspective view of part of an example assembly in accordance with the present invention.
Figure 2:
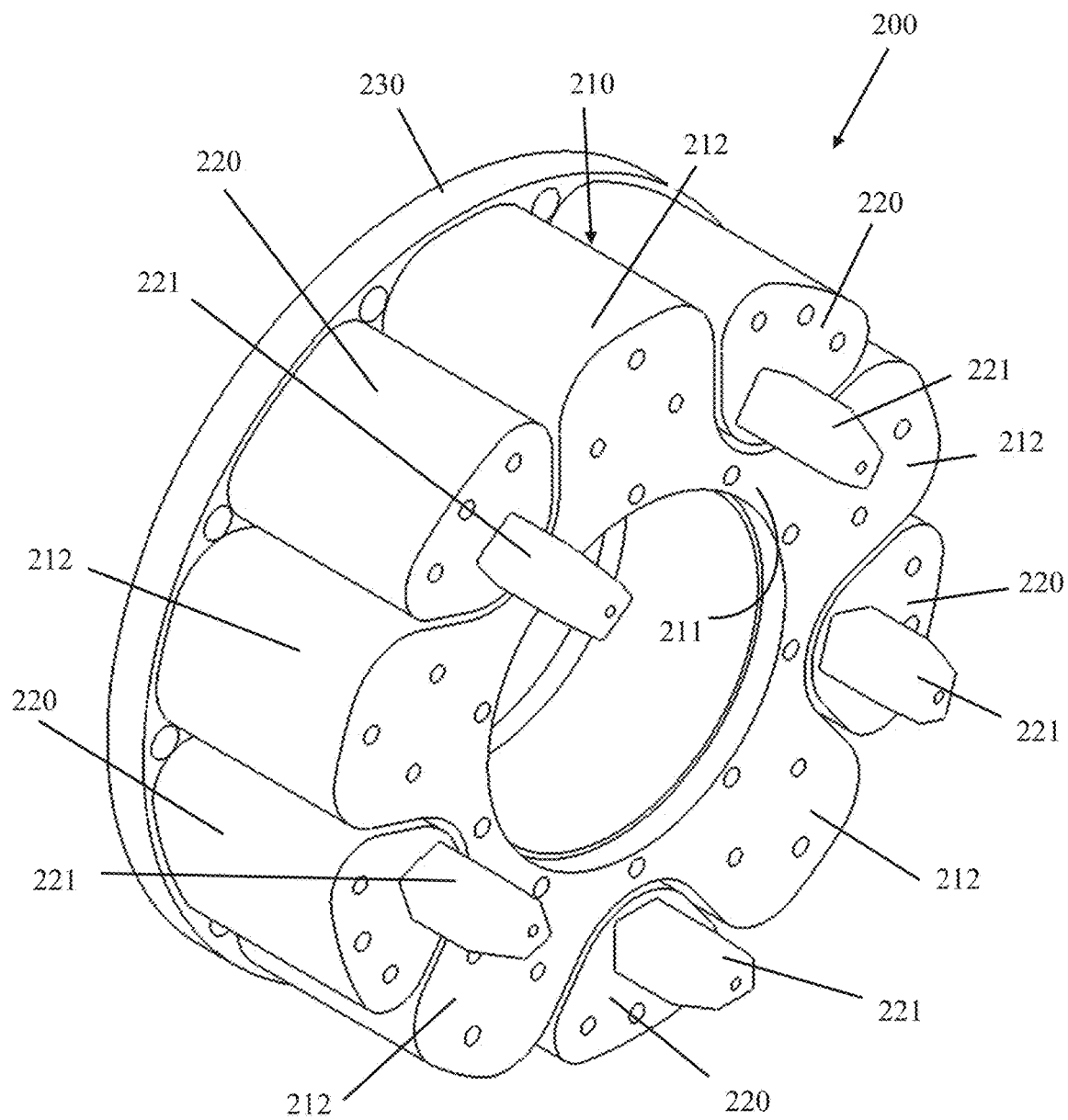
FIG. 2 is a schematic perspective view of another part of the example assembly added to the part of FIG. 1.
Figure 3:
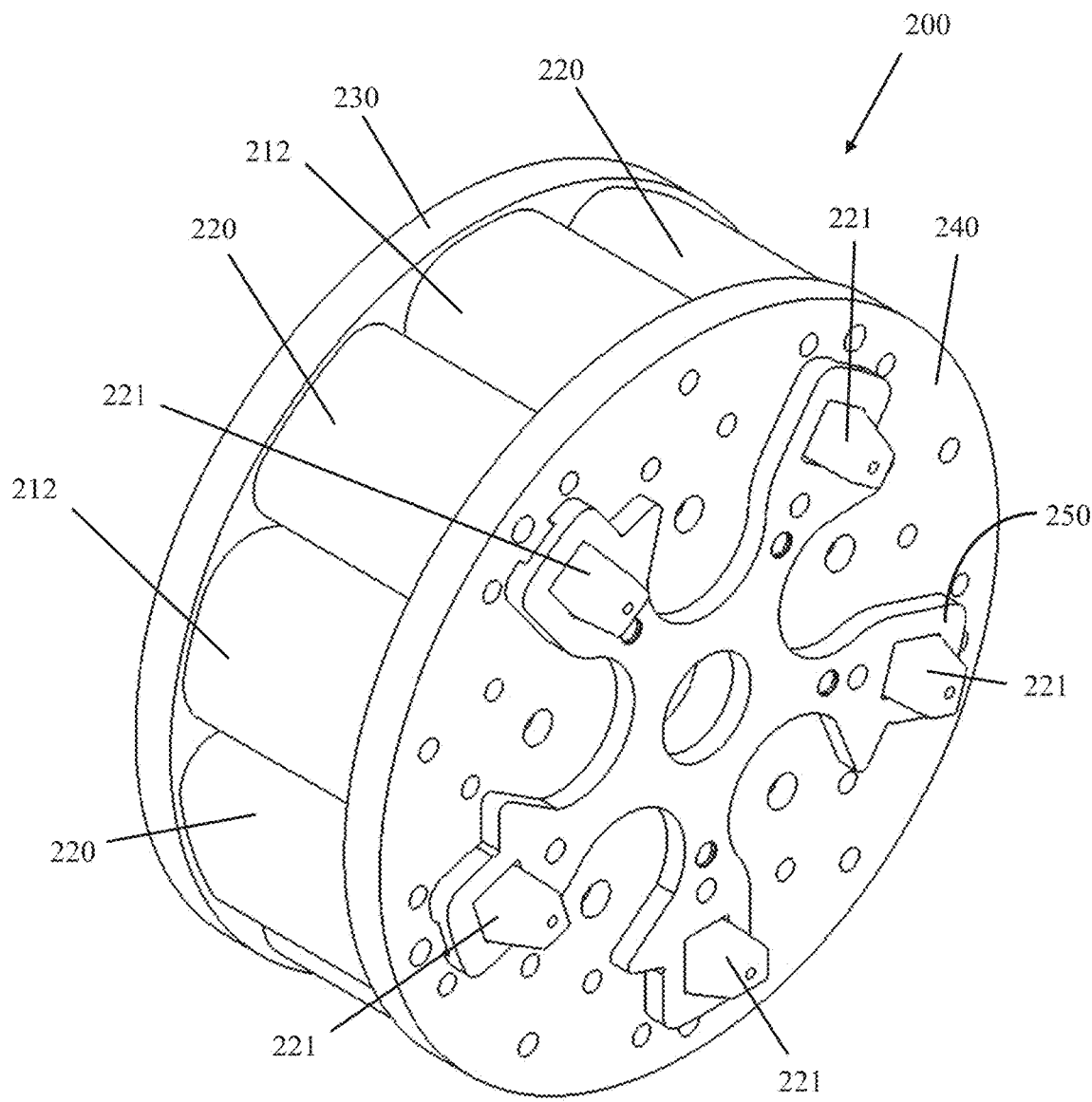
FIG. 3 is a schematic perspective view of still another part of the example assembly added to the parts of FIG. 2.
Figure 4:
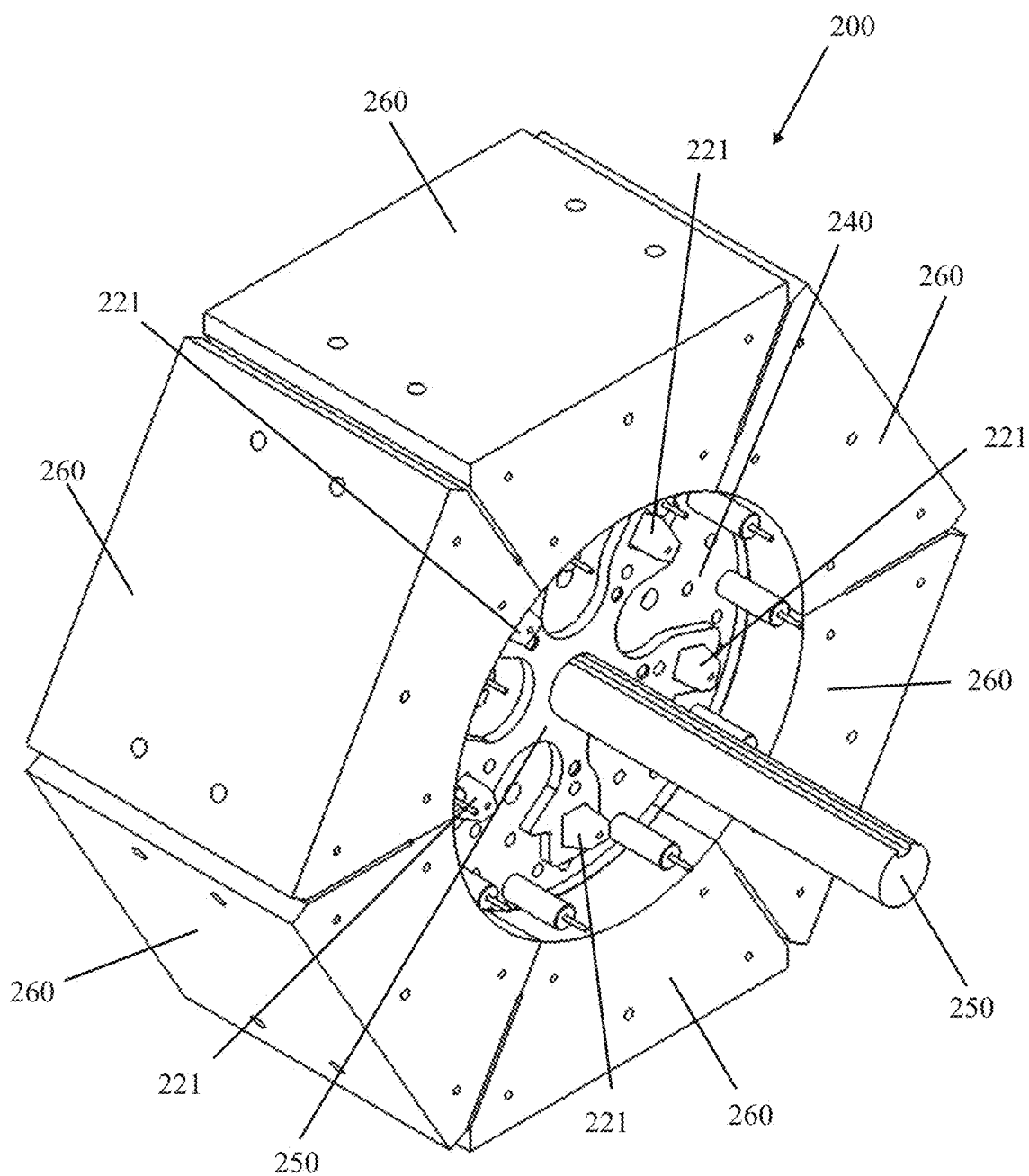
FIG. 4 is a schematic perspective view of yet another part of the example assembly added to the parts of FIG. 3.
Figure 5:
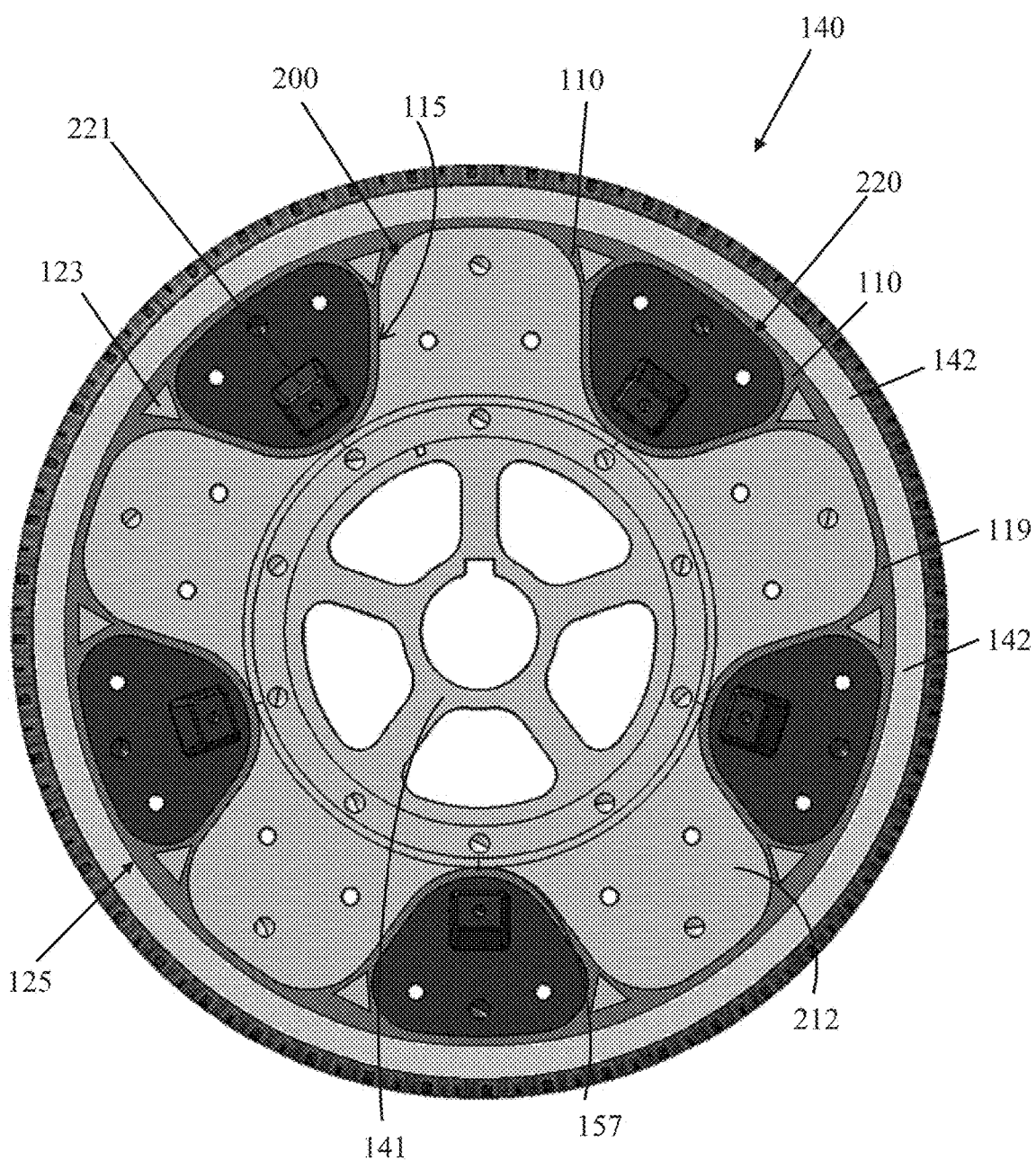
FIG. 5 is a schematic elevation view of the example assembly along with a wheel/tire produced by the example assembly.

As shown in FIG. 5, an example tire assembly 140 in accordance with the present invention may be formed from a lightweight polymer material, such as, for example, a standard tire rubber compound, a thermoplastic polymer, polyethylene terephthalate (PET), polyether ether ketone (PEEK), a cross-linking polymer like natural rubber, synthetic rubber-like polymers, epoxy resins, and/or phenolic resins. The assembly 140 may have an inner central rim 141, such as an automobile wheel, and a circular outer flexible ring 142, which may include a shear band and tread structure, mounted on the inner central rim 141 by a continuous cord/fabric reinforced spoke structure 110 extending between the inner central rim and the outer ring.

The spoke structure 110 may define a plurality of cavities disposed concentrically about the inner central rim 141 allowing the spoke structure to deflect under load thereby defining a suitable balance between flexibility for ride comfort and traction within a footprint of the assembly 140 and stiffness for vehicle handling, low rolling resistance, and low heat build-up within the spoke structure. The cavities of the spoke structure 110 may further define openings for arms of the inner central rim 141 to extend therethrough and secure the spoke structure to the inner central rim. The arms may engage portions 157 of the spoke structure 110 in a mechanical interlocking arrangement. The inner central rim 141 may further include plates that, along with the arms may sandwich the portions 157 of the spoke structure 110 and create a further frictional and/or adhesive securement between the inner central rim 141 and the spoke structure. The spoke structure 110 may comprise a homogenous or heterogeneous polymer and/or a filled polymer.

Spokes 115 of the spoke structure 110 may be curved inwardly or outwardly for mitigating or enhancing buckling of the spokes. The spokes 115 may include one or more reinforcing layers 119. The layer(s) 119 may be constructed of single end dipped cords, conventional pneumatic tire ply/cord arrangements, short fibers, and/or polymeric film. Further, these constructions may be PET, nylon 6, nylon 6,6, rayon, steel, glass fibers, carbon fiber, aramid, and/or a hybrid construction of these materials. The cords may be from 400 denier to 9000 denier. The polymeric film may be from 0.1 mm to 2.0 mm thick. The reinforcement of the spokes 115 may be oriented at angle between 0 degrees and 90 degrees. The spokes 115 may be continuously reinforced across their entire axial length. Continuous reinforcement layer(s) may extend radially outward to multiple locations adjacent to a shear band at the outer flexible ring 142.

Each cavity may have a common cross sectional profile about the axis of rotation of the assembly. Further, each cavity may have a common axial length equal to a uniform axial thickness of the spoke structure 110. Each cavity may be curvedly shaped to prevent "pinch" points on the reinforcement layer(s) and mitigate compressive stress concentrations on the reinforcement layer(s). The number of cavities may be between 2 and 60 for large scale assemblies 140. The inner central rim 141 may include steel, cast iron, aluminum, aluminum alloys, magnesium allows, and/or iron alloys.

As shown in FIGS. 1-4, a system 200 or method of manufacturing a wheel/tire, such as the example assembly 140, may include a core 210 having a cylindrical hub 211 and radially protruding extensions 212 projecting radially outward from the hub. The system 200 may further include a plurality of internal arcuate members 220 for positioning the reinforcing layer(s) 119 about the core 210. The internal arcuate members 220 may have axial projections 221 be located in the spaces between the extensions 212 of the core 210. Further, the projections 221 of internal arcuate members 220 may be radially secured in place by a first side plate 230 extending through corresponding axial shafts in the first side plate. A second side plate 240 with corresponding openings for the projections 221 of the internal arcuate members 220 may axially secure the core 210 and internal arcuate members 220 to each other. A plurality of external arcuate members 260 may encase the tire/wheel assembly 140, as well as the core 210, the internal arcuate members 220, first side plate 230, and second side plate 240, to form a system 200 and thereby cure the tire assembly.

Figure 6:
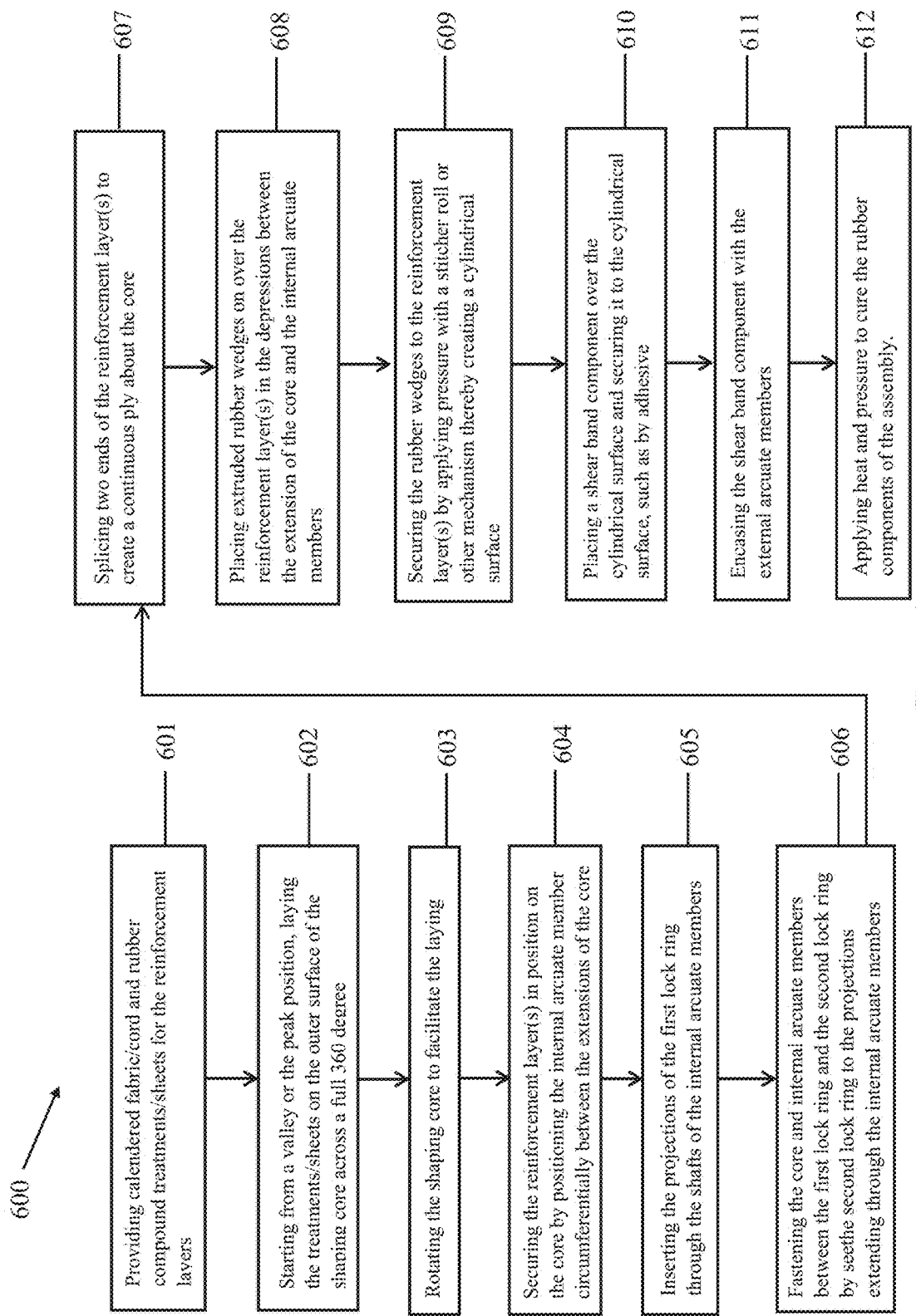
FIG. 6 is a schematic illustration of a method in accordance with the present invention.

The above described system 200 may be utilized with the following method 600 for manufacturing a non-pneumatic tire/wheel, such as the example assembly 140 (FIG. 6). Such a method 600, in accordance with the present invention, may include the steps of: providing 601 calendered fabric/cord and rubber compound treatments/sheets for the reinforcement layers 119; starting from a valley or the peak position, laying 602 the treatments/sheets on the outer surface of the shaping core 210 across a full 360 degree circumference of the core 210; rotating 603 the shaping core 210 to facilitate the laying step 602; securing 604 the reinforcement layer(s) 119 in position on the core 210 by positioning the internal arcuate members 220 circumferentially between the extensions 212 of the core 210; inserting 605 the projections 221 of the internal arcuate members 220 through shafts of the side plates 230, 240 and two lock rings (one shown 250); fastening 606 the core 210 and internal arcuate members 220 between one lock ring and the first side plate 230 and the other lock ring 250 and the second side plate 240 by securing the other lock ring 50 and the second side plate 240 to the projections 221 extending from the internal arcuate members; splicing 607 two ends of the reinforcement layer(s) 119 to create a continuous ply about the core 210; placing 608 extruded rubber wedges 123 on over the reinforcement layer(s) 119 in the depressions between the extensions 212 of the core 210 and the internal arcuate members 220 (See FIG. 5); securing 609 the rubber wedges to the reinforcement layer(s) 119 by applying pressure with a stitcher roll, rubber to rubber tackiness, and/or other suitable mechanism thereby creating a substantially cylindrical surface 125; placing 610 a shear band component and/or a tread component over the cylindrical surface 125 and securing it to the cylindrical surface 125, such as by adhesive, rubber to rubber tackiness, and/or other suitable mechanism; encasing 611 the shear band component/tread component with the external arcuate members 260; and applying 612 heat and pressure to cure the rubber components of the assembly 140. The core 210 and internal arcuate members 220 may be heated electrically, by steam, and/or other suitable method. The first and second side plates 230, 240 may further include spring loaded vents for relieving pressure from expansion of the shear band component/tread component during the application step 612.

Variations in the present invention are possible in light of the description of it provided herein. While certain representative examples and details have been shown for the purpose of illustrating the subject invention, it will be apparent to those skilled in this art that various changes and modifications can be made therein without departing from the scope of the subject invention. It is, therefore, to be understood that changes can be made in the particular examples described which will be within the full scope of the present invention as defined by the following appended claims. Further, the present invention is not limited to the examples hereinbefore described which may be varied in both construction and detail within the full scope of the appended claims.

What is claimed:

1. A system for manufacturing a tire assembly, the system comprising:
   a core having a cylindrical hub and radially protruding extensions projecting radially outward from the hub;
   a plurality of internal arcuate members for positioning a reinforcing layer of the tire assembly about the core, the internal arcuate members of the system being disposed in spaces circumferentially between the extensions of the core;
   a first side plate for securing the internal arcuate members of the system in place relative to the core; and
   a second side plate for securing the core and internal arcuate members of the system to each other, the internal arcuate members of the system having axial projections extending through corresponding axial shafts in each of the first and second side plates.

2. The system as set forth in claim 1 further including a plurality of external arcuate members encasing the assembly, as well as the core, the internal arcuate members, the first side plate, and the second side plate, to form an apparatus for curing the assembly.

3. The system as set forth in claim 1 wherein the reinforcing layer comprises calendered fabric and rubber compound treatments.

4. The system as set forth in claim 1 wherein the reinforcing layer comprises calendered fabric and rubber compound treatments applied to an outer surface of the core across a full 360 degree circumference of the core.

5. The system as set forth in claim 1 wherein projections of the internal arcuate members of the system are inserted through shafts in the first and second side plates.

6. The system as set forth in claim 1 further including extruded rubber wedges disposed on the reinforcing layer in depressions between the extensions of the core and the internal arcuate members of the system.

7. The system as set forth in claim 1 wherein projections of the internal arcuate members of the system are axially inserted through shafts in the first and second side plates with the projections engaging lock rings.

8. The system as set forth in claim 1 wherein projections of the internal arcuate members of the system are axially inserted through axial shafts within the first and second side plates with the projections of the internal arcuate members of the system engaging the first and second side plates to secure the core and the internal arcuate members of the system in radial alignment.

9. The system as set forth in claim 1 wherein the reinforcing layer comprises calendered fabric and rubber compound treatments applied to an outer surface of the core across a full 360 degree circumference of the core with a shear band structure applied over the reinforcement layer.

* * * * *